United States Patent
Lee et al.

(10) Patent No.: US 12,103,419 B2
(45) Date of Patent: Oct. 1, 2024

(54) BOARD CHARGER CONTROLLER FOR VEHICLE, SYSTEM INCLUDING THE SAME, AND METHOD THEREOF

(71) Applicants: Hyundai Motor Company, Seoul (KR); Kia Motors Corporation, Seoul (KR)

(72) Inventors: Sang Kyu Lee, Gyeonggi-do (KR); Jin Gyu Lim, Gyeongsangbuk-do (KR); Seung Myun Chung, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 118 days.

(21) Appl. No.: 17/034,060

(22) Filed: Sep. 28, 2020

(65) Prior Publication Data
US 2021/0347277 A1 Nov. 11, 2021

(30) Foreign Application Priority Data
May 6, 2020 (KR) .......................... 10-2020-0053890

(51) Int. Cl.
*B60L 53/62* (2019.01)
*B60L 53/50* (2019.01)
*H02J 7/04* (2006.01)

(52) U.S. Cl.
CPC .............. *B60L 53/62* (2019.02); *B60L 53/50* (2019.02); *H02J 7/04* (2013.01); *H02J 2310/48* (2020.01)

(58) Field of Classification Search
CPC ... B60L 53/50; B60L 53/62; H02J 7/04; H02J 2310/48; Y02T 10/70; Y02T 10/7072; Y02T 90/12; Y02T 90/14
See application file for complete search history.

(56) References Cited

U.S. PATENT DOCUMENTS

| | | | |
|---|---|---|---|
| 2013/0286697 A1* | 10/2013 | Eiland | H02J 3/26 363/71 |
| 2015/0298562 A1* | 10/2015 | Czainski | B60L 9/00 307/9.1 |
| 2019/0128942 A1* | 5/2019 | Luebke | H02H 3/006 |
| 2020/0212709 A1* | 7/2020 | de Callafon | H02J 3/0012 |
| 2020/0321796 A1* | 10/2020 | Chang | H02M 1/10 |
| 2021/0078430 A1* | 3/2021 | Engel | G01R 31/52 |
| 2021/0135584 A1* | 5/2021 | Dutta | H02M 3/33561 |
| 2021/0297026 A1* | 9/2021 | Yokouchi | H02P 27/06 |

FOREIGN PATENT DOCUMENTS

JP 6211187 B2 10/2017
KR 10-2013-0067413 A 6/2013

\* cited by examiner

*Primary Examiner* — Richard Isla
*Assistant Examiner* — Johali A Torres Ruiz
(74) *Attorney, Agent, or Firm* — Fox Rothschild LLP

(57) ABSTRACT

An OBC controller for vehicle, a system including the same, and a method thereof are provided. The OBC controller includes a measurement device that measures a voltage of each phase of a three-phase OBC and a controller that calculates an impedance of each phase using a voltage of each phase. The voltage is measured before charging of the three-phase OBC starts. The controller also calculates a charging amount for each phase, the charging amount corresponding to the impedance of each phase, and adjusts charging based on the calculated charging amount for each phase.

5 Claims, 6 Drawing Sheets

BOARD CHARGER CONTROLLER FOR VEHICLE, SYSTEM INCLUDING THE SAME, AND METHOD THEREOF

CROSS-REFERENCE TO RELATED APPLICATION

This application claims the benefit of priority to Korean Patent Application No. 10-2020-0053890, filed on May 6, 2020, the entire contents of which are incorporated herein by reference.

TECHNICAL YIELD

The present disclosure relates to an on board controller (OBC) controller for vehicle, a system including the same, and a method thereof, and more particularly, relates to technologies of resolving power unbalance of a three-phase OBC.

BACKGROUND

As there has been an increase in the need for an Eco-friendly vehicle (e.g., a plug-in hybrid electric vehicle (PHEV)/electric vehicle (EV)) due to environmental regulations of North America and Europe, the PHEV and the EV have been in the spotlight. One of the interests of consumers for such an Eco-friendly vehicle is a charging driving distance for long-distance driving. There is a need to increase the capacity of a high-voltage battery to increase a driving distance. There is also a need to consider an increase in the capacity of an on board charger (OBC) for charging the high-voltage battery together with increasing the capacity of the high-voltage battery to maintain any degree of a charging time before the increase after increasing the capacity of the high-voltage battery.

However, increasing the capacity of the OBC two to four times causes an increase in size and an increase in costs. Since increasing the capacity of the OBC using a single-phase power results in power unbalance, a high-power OBC, which is currently being developed, charges a battery using a three-phase power. In particular, a power of each phase should be balanced for an OBC which uses the three-phase power, and a power of each phase is controlled separately.

However, when the control is performed to uniformly supply a power of each phase in a state where supplied power is unbalanced, there is a probability that power unbalance will be worse. Furthermore, a three-phase transformer may be overloaded when the power unbalance is worse, and an incorrect operation of an electrical load which uses a three-phase power may occur. Particularly, when a three-phase OBC operates in a situation where a single-phase load of one side is used excessively, because three phases desire to equally receive power, phase unbalance may be worse.

SUMMARY

The present disclosure provides an OBC controller for vehicle for enhancing safety of used power by calculating a three-phase unbalance degree when a three-phase power of a three-phase OBC is charged in an unbalanced state and differently supplying power consumed for each phase to resolve unbalance, a system including the same, and a method thereof.

The technical problems to be solved by the inventive concept are not limited to the aforementioned problems, and any other technical problems not mentioned herein will be clearly understood from the following description by those skilled in the art to which the present disclosure pertains.

According to an aspect of the present disclosure, an OBC controller for vehicle may include a measurement device configured to measure a voltage of each phase of a three-phase OBC and a controller configured to calculate an impedance of each phase using a voltage of each phase, the voltage being measured before charging of the three-phase OBC starts, calculate a charging amount for each phase, the charging amount corresponding to the impedance of each phase, and adjust charging based on the calculated charging amount for each phase.

In an exemplary embodiment, the controller may be configured to increase current supplied to each phase, after measuring the voltage of each phase before the charging starts. In addition, the controller may be configured to operate the measurement device to measure a voltage of each phase of the three-phase OBC, after increasing the current and may be configured to calculate a voltage drop value which is a difference value between the voltage of each phase, the voltage being measured before the charging starts and the voltage of each phase, the voltage being measured after the current is increased.

The controller may be configured to calculate a phase difference between a voltage of each phase and a current of each phase. In addition, the controller may be configured to calculate an impedance of each phase of the three-phase OBC based on the voltage drop value and the phase difference between the voltage and the current. The controller may be configured to calculate the charging amount inversely proportional to the impedance.

Further, the controller may be configured to calculate the charging amount for each phase using the voltage of each phase, the voltage being measured before the charging starts, and the impedance of each phase. The controller may be configured to divide a value, obtained by subtracting a voltage of a first phase, the voltage being measured before the charging starts, from the amount of current obtained by uniformly distributing a total supplied charging amount, by an impedance of the first phase to calculate a charging amount supplied to the first phase, when the voltage of the first phase among three phases, the voltage being measured before the charging starts, is less than a predetermined reference value.

In an exemplary embodiment, the controller may be configured to divide a value, obtained by adding a voltage of a second phase, the voltage being measured before the charging starts, to the amount of current obtained by uniformly distributing a total supplied charging amount, by an impedance of the second phase to calculate a charging amount supplied to the second phase, when the voltage of the second phase among the three phases, the voltage being measured before the charging starts, is greater than the predetermined reference value. The controller may be configured to set a middle value among voltage values of three phases, the voltage values being measured before the charging starts, as a reference value for calculating the charging amount.

According to another aspect of the present disclosure, a vehicle system may include a three-phase OBC and an OBC controller configured to calculate an impedance of each phase using a voltage of each phase, before charging of the three-phase OBC starts, calculate a charging amount for each phase, the charging amount corresponding to the impedance of each phase, and adjust charging based on the calculated charging amount for each phase. According to another aspect of the present disclosure, a method for operating an OBC for vehicle may include measuring a voltage of each phase of a three-phase OBC, calculating an impedance of each phase using the voltage of each phase, and calculating a charging amount for each phase, the charging amount corresponding to the impedance of each phase, and adjusting charging based on the calculated charging amount for each phase.

In an exemplary embodiment, the measuring of the voltage may include measuring a voltage of each phase before charging of the three-phase OBC starts and adjusting a level of current supplied to each phase based on a voltage unbalance degree of each phase before the charging of the three-phase OBC starts. In addition, the calculating of the impedance of each phase may include increasing the current supplied to each phase. The calculating of the impedance of each phase may further include measuring a voltage of each phase of the three-phase OBC, after increasing the current.

Further, the calculating of the impedance of each phase may include calculating a voltage drop value which is a difference value between the voltage of each phase, the voltage being measured before the charging starts, and the voltage of each phase, the voltage being measured after the current is increased. The calculating of the impedance of each phase may further include calculating a phase difference between a voltage of each phase and a current of each phase.

In an exemplary embodiment, the calculating of the impedance of each phase may further include calculating an impedance of each phase of the three-phase OBC based on the voltage drop value and the phase difference between the voltage and the current. The adjusting of the charging may include calculating the charging amount inversely proportional to the impedance.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
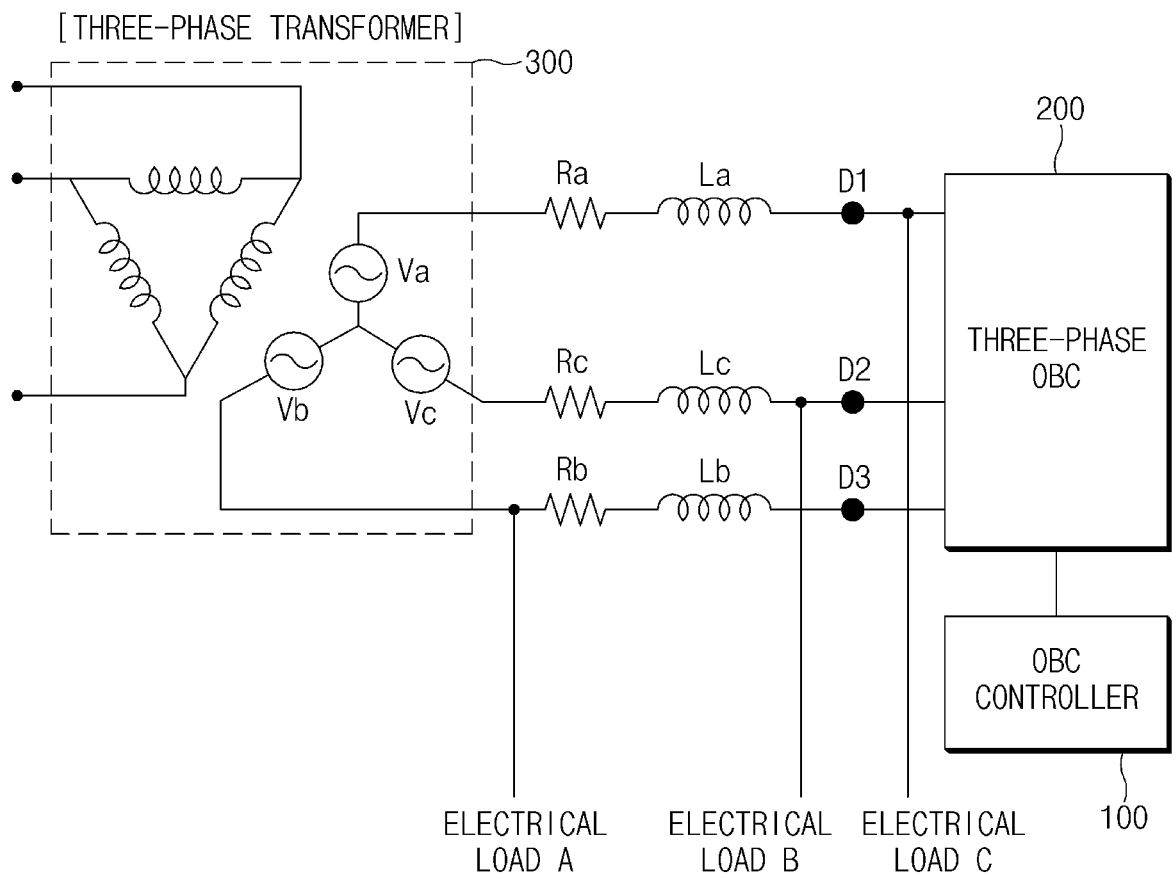
FIG. 1 is a block diagram illustrating a configuration of an OBC system for vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
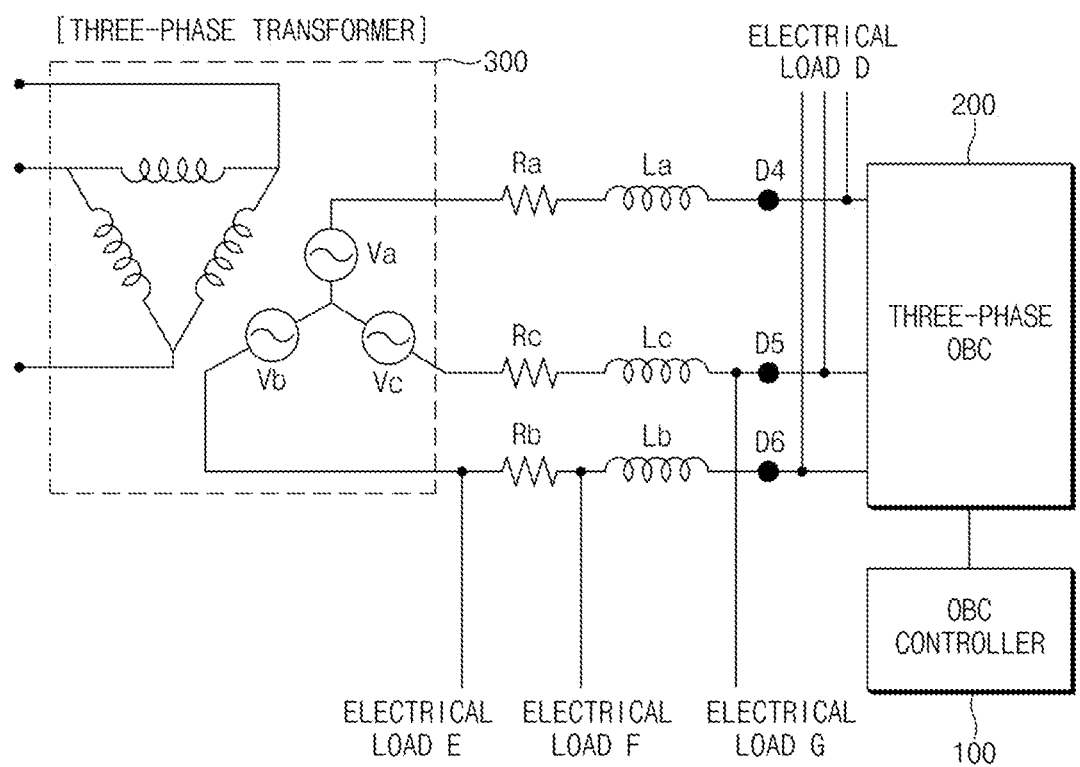
FIG. 2 is a block diagram illustrating an example of connecting an electrical load of an OBC system for vehicle according to an exemplary embodiment of the present disclosure.

Hereinafter, exemplary embodiments of the present disclosure will be described in detail with reference to FIGS. 1 to 6. FIG. 1 is a block diagram illustrating a configuration of a vehicle system including an on board charger (OBC) controller for vehicle according to an exemplary embodiment of the present disclosure. FIG. 2 is a block diagram illustrating an example of connecting an electrical load of an OBC system for vehicle according to an exemplary embodiment of the present disclosure.

Referring to FIGS. 1 and 2, an OBC system for vehicle according to an exemplary embodiment of the present disclosure may include an OBC controller 100 for vehicle, a three-phase OBC 200, and a three-phase transformer 300. The three-phase OBC 200 may be implemented as a three-phase circuit for high-capacity charging. Although not illustrated in FIGS. 1 and 2, the three-phase OBC 200 may include a transformer for each phase, a switch device, or the like. In particular, the three-phase OBC 200 may be connected in parallel for each phase or may be composed by connecting a three-phase power factor corrector (PFC) with three direct current-direct current (DC-DC) converters in parallel. Herein, the DC-DC converter may be connected in a single phase.

The three-phase transformer 300 may be configured to transform a power of each phase, which is supplied from the three-phase OBC 200, and transfer the transformed power to a high-voltage battery. FIG. 1 discloses a structure where an electrical load A, B, or C for each phase of the three-phase OBC 200 is connected. FIG. 2 discloses a structure where an additional single-phase load E, F, or G as well as an electrical load D for each phase of the three-phase OBC 200 is connected.

As shown in FIG. 2, the single-phase loads E and F may be connected to a first phase among three phases, the single-phase load G may be connected to a second phase, and an additional single-phase load fail to be connected to a third phase. In particular, power unbalance of each phase may occur. Thus, the OBC controller 100 for vehicle according to an exemplary embodiment of the present disclosure may be configured to calculate a difference between voltages of three phases and may be configured to differently apply a level of power supplied to each phase to control to uniformly supply power although the number or level of electrical loads connected to each phase differs.

The OBC controller 100 for vehicle according to an exemplary embodiment of the present disclosure may be implemented in a vehicle. In particular, the OBC controller 100 may be integrally configured with controllers in the vehicle or may be implemented as a separate device to be connected with the controllers of the vehicle by a separate connection means. When a three-phase power is charged in an unbalanced state, the OBC controller 100 for vehicle may be configured to calculate an unbalance degree for each phase and may be configured to differently apply power consumed for each phase, thus preventing an unbalanced power.

Figure 3:
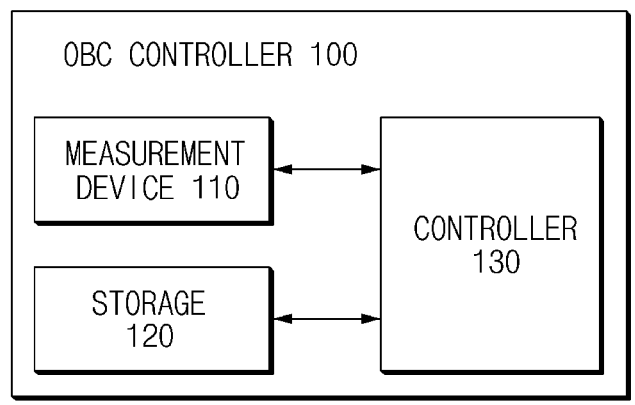
FIG. 3 is a block diagram illustrating a configuration of an OBC controller for vehicle according to an exemplary embodiment of the present disclosure.

FIG. 3 is a block diagram illustrating a configuration of an OBC controller for vehicle according to an exemplary embodiment of the present disclosure. The OBC controller 100 may include a measurement device 110, a storage 120, and a controller 130. The measurement device 110 may be configured to measure voltage for each phase of a three-phase OBC 200, current for each phase, and a phase difference between the current and the voltage and may be configured to deliver the measured value to the controller 130. In particular, the measurement device 110 may include a separate or integrated sensor to measure voltage, current, and a phase difference between the current and the voltage. A location where voltage for each phase, current for each phase, a phase difference between the current and the voltage may be D1, D2, D3, D4, D5, or D6 of FIGS. 1 and 2.

The storage 120 may be configured to store a sensing result of the measurement device 110 and data, algorithms, and/or the like necessary for an operation of the controller 130. As an example, the storage 120 may be configured to store the result of measuring voltage for each phase and the value calculated by the controller 130. The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The controller 130 may be electrically connected with the measurement device 110, the storage 120, or the like and may electrically control the respective components. The controller 130 may be an electrical circuit configured to execute instructions of software and may be configured to perform a variety of data processing and calculation described below. The controller 130 may be configured to process a signal delivered between the respective components of the OBC controller 100 for vehicle. The controller 130 may be, for example, an electronic control unit (ECU), a micro controller unit (MCU), or another sub-controller, which is loaded into the vehicle. In particular, the controller 130 may be configured to determine an impedance unbalance degree of each phase using a voltage drop value which is a difference value between a three-phase voltage measured before charging of a three-phase OBC 200 starts and a three-phase voltage measured after current supplied to three phases is increased, may be configured to calculate a charging amount for each phase, which corresponds to the impedance unbalance degree of each phase, and may be configured to adjust charging based on the calculated charging amount for each phase.

After measuring the voltage of each phase before charging starts to calculate a voltage drop value of each phase of the three-phase OBC 200, the controller 130 may be configured to equally increase current supplied to three phases and measure the voltage of each phase to calculate a voltage drop value. For example, when voltages Va1, Vb1, and Vc1 of three phases are 210 V, 220 V, and 230 V, respectively, since the voltage of phase a (e.g., a first phase) is less than the voltage of phase b (e.g., a second phase) by 10 V based on the voltage (210 V) of phase b, which is a middle value, and since the voltage of phase c (e.g., a third phase) is greater than the voltage of the second phase by 10 V, the controller 130 may be configured to determine that unbalance of 10 V occurs. The controller 130 may be configured to equally increase current supplied to each phase, measure voltages Va2, Vb2, and Vc2 of three phases, and calculate a value obtained by subtracting Va2, Vb2, and Vc2 from Va1, Vb1, and Vc1 as a voltage drop value.

Figure 4:
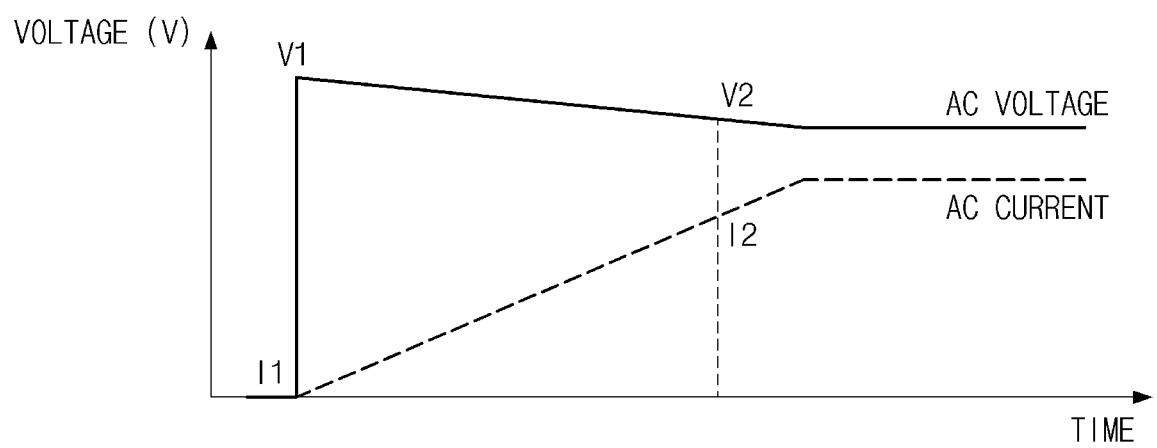
FIG. 4 is a graph illustrating a change in voltage and current of a three-phase OBC for vehicle according to an exemplary embodiment of the present disclosure.

FIG. 4 is a graph illustrating a change in voltage and current of a three-phase OBC for vehicle according to an exemplary embodiment of the present disclosure. As shown in FIG. 4, a voltage drop degree of each phase according to an increase in current supplied to each phase may be identified. In other words, when current I1 increases to current I2 after a certain time period, voltage V1 drops to voltage V2 and V2-V1 may be a voltage drop value. At this time, the amount of saturated current may be an amount of reference current for measurement. A controller 130 of FIG. 3 may be configured to calculate a three-phase impedance using a voltage drop value according to an increase in three-phase current and a phase difference between a three-phase voltage and a three-phase current.

Figure 5:
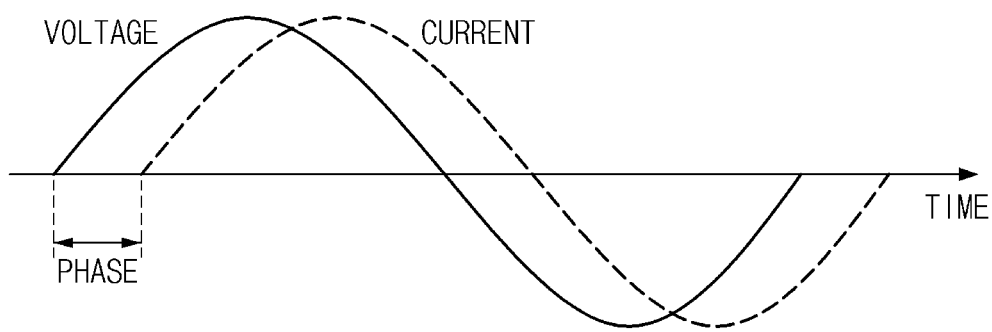
FIG. 5 is a graph illustrating a phase difference between a voltage and a current of a three-phase OBC for vehicle according to an exemplary embodiment of the present disclosure.

FIG. 5 is a graph illustrating a phase difference between a voltage and a current of a three-phase OBC for vehicle according to an exemplary embodiment of the present disclosure. As shown in FIG. 5, a controller 130 of FIG. 3 may be configured to measure a time when a value of each of voltage and current is "0" to obtain a time difference and calculate a phase difference between voltage and current. The controller 130 may use various general schemes to calculate a phase difference between voltage and current.

After current increases, a voltage of each phase is Va2, Vb2, or Vc2. Herein, a voltage drop value according to an increase in current is a value obtained by subtracting voltage values Va2, Vb2, and Vc2, after supplied current is adjusted, from voltage values Va1, Vb1, and Vc1 before charging starts. The controller 130 may be configured to calculate impedance Za, Zb, or Zc for each phase like Equation 1 below using the voltage drop value and the phase difference and determine an impedance unbalance degree of each phase, which is a difference between impedance values of three phases.

$$Za = (Va1 < 0° - Va2 < 0°)/Ia < \theta$$

$$Zb = (Vb1 < 0° - Vb2 < 0°)/Ib < \theta$$

$$Zc = (Vc1 < 0° - Vc2 < 0°)/Ic < \theta \quad \text{Equation 1}$$

The controller 130 may be configured to calculate a charging amount for each phase using a voltage of each phase, which is measured before charging starts, and an impedance of each phase. In particular, a charging amount Ca, Cb, or Cc for each phase may be calculated as Equation 2 below.

$$Ca = (Iideal - Va/Za)$$

$$Cb = (Iideal + Vb/Zb)$$

$$Cc = (Iideal + Vc/Zc)$$

Particularly, Iideal refers to the amount of current supplied ideally in balance to each phase. When the supplied power is 6.6 Kw, 2.2 Kw (=220 V×10 A) should be supplied for each phase, the amount of current supplied in balance is 10 A. Each charging amount in Equation 2 above refers to the amount of current. Thus, the controller 130 may be configured to calculate a charging amount inversely proportional to a level of a three-phase impedance. Like Equation 2 above, an OBC controller 100 for vehicle may be configured to calculate a value, obtained by subtracting a value obtained by dividing a voltage (210V) of phase a by an impedance Za of phase a from the amount of balanced distribution current, which is the amount of current supplied ideally in balance to each phase, as a charging amount of phase a and may be configured to calculate a charging amount supplied to phase b or c.

In response to determining that a voltage of a first phase among three phases, which is measured before charging starts, is less than a predetermined reference value, the controller 130 may be configured to calculate a charging amount supplied to the first phase by dividing a value, obtained by subtracting the voltage of the first phase, which is measured before the charging starts, from the amount of current obtained by uniformly distributing the total supplied charging amount, by an impedance of the first phase. In response to determining that a voltage of a second phase among three phases, which is measured before charging starts, is greater than the predetermined reference value, the controller 130 may be configured to calculate a charging amount supplied to the second phase by dividing a value, obtained by adding the voltage of the second phase, which is measured before the charging starts, to the amount of current obtained by uniformly distributing the total supplied charging amount, by an impedance of the second phase.

The controller 130 may be configured to set a middle value among voltage values measured before charging of each phase starts as a reference value for calculating a charging amount. In other words, it may be seen that charging amounts of phases a and c may be calculated based on a voltage value of phase b in Equation 2 above. Thus, the controller 130 may be configured to adjust the amount of current supplied according to a charging amount for each phase, thus resolving voltage unbalance.

Figure 6:
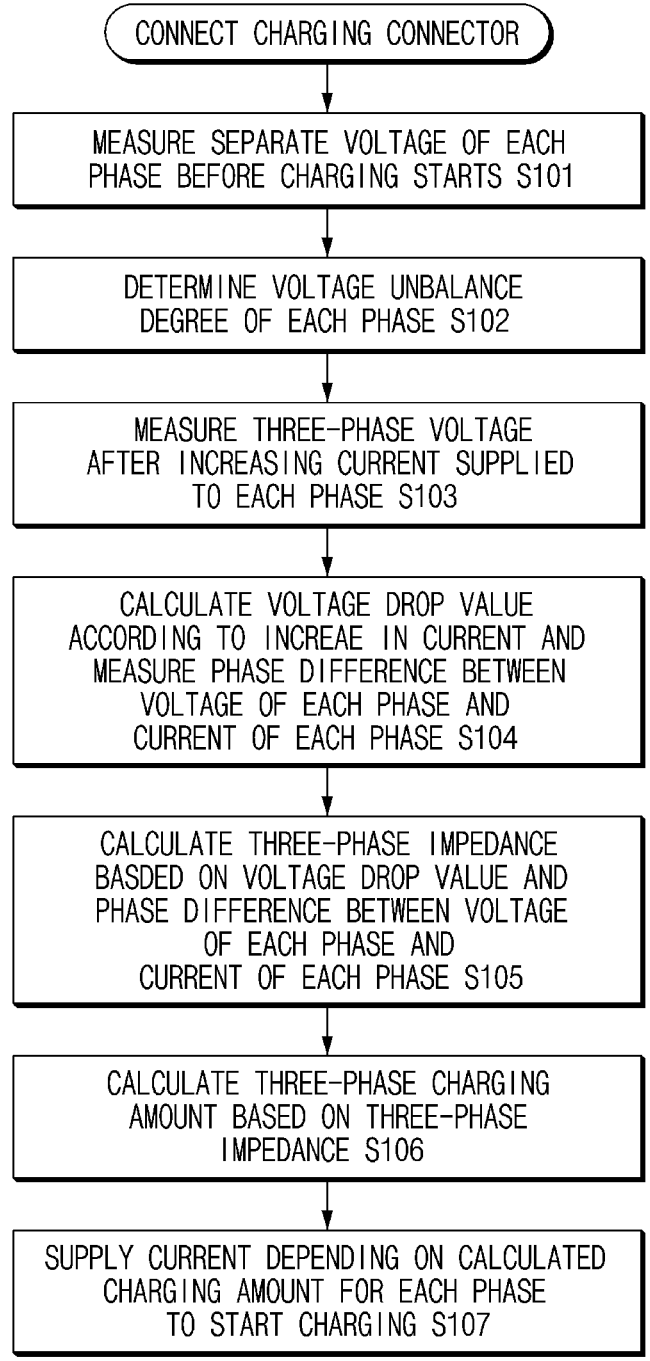
FIG. 6 is a flowchart illustrating a method for controlling an OBC for vehicle according to an exemplary embodiment of the present disclosure.

Hereinafter, a description will be given in detail of a method for operating an OBC for vehicle according to an exemplary embodiment of the present disclosure with reference to FIG. 6. FIG. 6 is a flowchart illustrating a method for controlling an OBC for vehicle according to an exemplary embodiment of the present disclosure. Hereinafter, it may be assumed that an OBC controller 100 for vehicle in FIG. 1 performs a process of FIG. 6. Furthermore, in a description of FIG. 6, an operation described as being performed by an apparatus may be understood as being operated by a controller 130 of the OBC controller 100 for vehicle.

Referring to FIG. 6, in S101, the apparatus may be configured to measure a separate voltage of each phase of a three-phase OBC 200 before charging starts. In particular, the apparatus may be configured to measure a separate voltage of each phase at a location of D1, D2, or D3 of FIG. 1. A voltage of each phase is Va1, Vb1, or Vc1. In S102, the apparatus may be configured to determine a voltage unbalance degree of each phase using a difference value between the measured voltages of three phases. When voltages Va1, Vb1, and Vc1 of three phases are 210 V, 220 V, and 230 V, respectively, since the voltage of a first phase is less than the voltage of a second phase by 10 V based on the voltage (210 V) of the second phase, which is a middle value, and since the voltage of a third phase is greater than the voltage of the second phase by 10 V, the apparatus may be configured to determine that unbalance of 10 V occurs.

In S103, the apparatus may be configured to measure a three-phase voltage while equally increasing current supplied to an OBC in each phase. In S104, the apparatus may be configured to calculate a voltage drop value using the voltage of each phase, which is measured after the current supplied to the OBC is increased, and the voltage of each phase, which is measured in S101, and may be configured to measure a phase difference between voltage and current.

For example, when the voltage of each phase after the current supplied to the OBC is increased is Va2, Vb2, or Vc2, a voltage drop value of each phase according to the increase in the current supplied to the OBC may be a value obtained by subtracting the voltage values Va2, Vb2, and Vc2 after the current supplied to the OBC is adjusted from the voltage values Va1, Vb1, and Vc1 before charging starts. In particular, a location for measuring a phase difference between voltage and current may be D1, D2, or D3 of FIG. 1.

Furthermore, in S105, the apparatus may be configured to calculate an impedance Za, Zb, or Zc of each phase using the voltage drop value of each phase and the phase difference between voltage and current to calculate an impedance unbalance degree. In particular, the impedance Za, Zb, or Zc of each phase may be calculated using Equation 1 above, and an impedance unbalance degree of each phase, which is a difference between impedance values of three phases, may be calculated. In S106, the apparatus may be configured to calculate a charging amount to be supplied for charging, using Equation 2 above based on a three-phase voltage Va, Vb1, or Vc1 before charging starts and a three-phase impedance Za, Zb, or Zc. In particular, the apparatus may be configured to calculate a three-phase charging amount as a value inversely proportional to the three-phase impedance.

For example, assuming that a voltage and an impedance of phase a among three phases are 210 V and Za, a voltage and an impedance of phase b among the three phases is 220 V and Zb, a voltage and an impedance of phase c among the three phases are 230 V and Zc, and a power of 6.6 Kw is charged, when power is distributed in balance to each phase a, b, or c, 2.2 Kw (=220 V×10 A) should be supplied each phase. However, when unbalance for each phase occurs, the apparatus may be configured to calculate a charging amount of each phase for power balance based on a predetermined reference value or a middle value (e.g., 220 V) among voltage values of three phases before charging of each phase starts.

The apparatus may be configured to calculate a value, obtained by subtracting a value obtained by dividing a voltage (210V) of phase a by an impedance Za of phase a from the amount of balanced distribution current, which is the amount of current supplied ideally in balance to each phase, as a charging amount of phase a, and may be configured to calculate a charging amount supplied to phase b or c. In particular, a charging amount of a phase, a voltage of which is low and an impedance of which is high, may be calculated to be relatively low. For example, when an operation power of 10 Kw is charged, it may be distributed into 3 Kw of phase a, 4.5 Kw of phase b, and 2.5 Kw of phase c.

In S107, the apparatus may be configured to differently supply the amount of current supplied according to the calculated charging amount for each phase, thus performing charging while resolving voltage unbalance. Accordingly, an exemplary embodiment of the prevent disclosure may improve stability of power of each phase upon power unbalance of each phase by an OBC which uses a three-phase power and may perform charging, thus preventing several devices (e.g., a three-phase power transformer, a load bank, and the like) of a power source from being damaged by a fire.

Thus, the operations of the method or the algorithm described in connection with the embodiments disclosed herein may be embodied directly in hardware or a software module executed by the controller, or in a combination thereof. The software module may reside on a storage medium (that is, the memory and/or the storage) such as a RAM, a flash memory, a ROM, an EPROM, an EEPROM, a register, a hard disk, a removable disk, and a CD-ROM.

The exemplary storage medium may be coupled to the controller, and the controller may read information out of the storage medium and may record information in the storage medium. Alternatively, the storage medium may be integrated with the controller. The controller and the storage medium may reside in an application specific integrated circuit (ASIC). The ASIC may reside within a user terminal. In another case, the controller and the storage medium may reside in the user terminal as separate components.

The present technology may enhance safety of used power by calculating a three-phase unbalance degree when a three-phase power of a three-phase OBC is charged in an unbalanced state and differently supplying power consumed for each phase, thus resolving unbalance. In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the exemplary embodiments. The scope of the present disclosure should be construed based on the accompanying claims, and all the technical ideas within the scope equivalent to the claims should be included in the scope of the present disclosure.

What is claimed is:

1. An on board charger (OBC) controller for vehicle, comprising:
    a measurement device configured to measure a voltage of each phase of a three-phase OBC; and
    a controller configured to:
        calculate an impedance of each phase using a voltage of each phase;
        increase current supplied to each phase, after measuring the voltage of each phase before the charging starts;
        operate the measurement device to measure a voltage of each phase of the three-phase OBC, after increasing the current;
        calculate a charging amount for each phase, the charging amount corresponding to the impedance of each phase; and
        adjust charging based on the calculated charging amount for each phase,
    wherein calculating the impedance of each phase comprises:
        calculating a phase difference between the voltage of each phase and a current of each phase;
        calculating a voltage drop value which is a difference value between the voltage of each phase measured before the charging starts and the voltage of each phase measured after the current is increased; and
        calculating the impedance of each phase of the three-phase OBC based on the voltage drop value and the phase difference between the voltage of each phase and the current of each phase; and wherein at least one load is connected to each phase, and the impedance changes according to the at least one load.

2. The OBC controller of claim 1, wherein the controller is configured to calculate the charging amount inversely proportional to the impedance.

3. A vehicle system, comprising:
a three-phase on board charger (OBC); and
an OBC controller configured to:
   calculate an impedance of each phase using a voltage of each phase,
   calculate a charging amount for each phase, the charging amount corresponding to the impedance of each phase, and
   adjust charging based on the calculated charging amount for each phase;
wherein at least one load is connected to each phase, and the impedance changes according to the at least one load;
wherein calculating the impedance of each phase comprises:
   calculating a phase difference between the voltage of each phase and a current of each phase;
   calculating a voltage drop value which is a difference value between the voltage of each phase the voltage being measured before the charging starts and a voltage being measured after current supplied to the three-phase OBC is increased; and
   calculating the impedance of each phase of the three-phase OBC based on the voltage drop value and the phase difference between the voltage of each phase and the current of each phase.

4. A method for controlling an on board charger (OBC) for vehicle, comprising:

measuring, by a controller, a voltage of each phase of a three-phase OBC before charging of the three-phase OBC starts;

increasing current supplied to each phase, after measuring the voltage of each phase before the charging starts;

measuring a voltage of each phase of the three-phase OBC after increasing the current;

calculating, by the controller, an impedance of each phase using the voltage of each phase; and calculating, by the controller, a charging amount for each phase, the charging amount corresponding to the impedance of each phase, and adjusting charging based on the calculated charging amount for each phase;

wherein at least one load is connected to each phase, and the impedance changes according to the at least one load; and wherein calculating the impedance of each phase comprises:
   calculating a phase difference between the voltage of each phase and a current of each phase;
   calculating a voltage drop value which is a difference value between the voltage of each phase measured before the charging starts and the voltage of each phase measured after current supplied to the three-phase OBC is increased; and
   calculating the impedance of each phase of the three-phase OBC based on the voltage drop value and the phase difference between the voltage and the current.

5. The method of claim 4, wherein the adjusting of the charging includes:
   calculating, by the controller, the charging amount inversely proportional to the impedance.

* * * * *